(No Model.)
G. R. CONNALLY.
CANISTER AND MEASURE.
No. 522,969. Patented July 17, 1894.
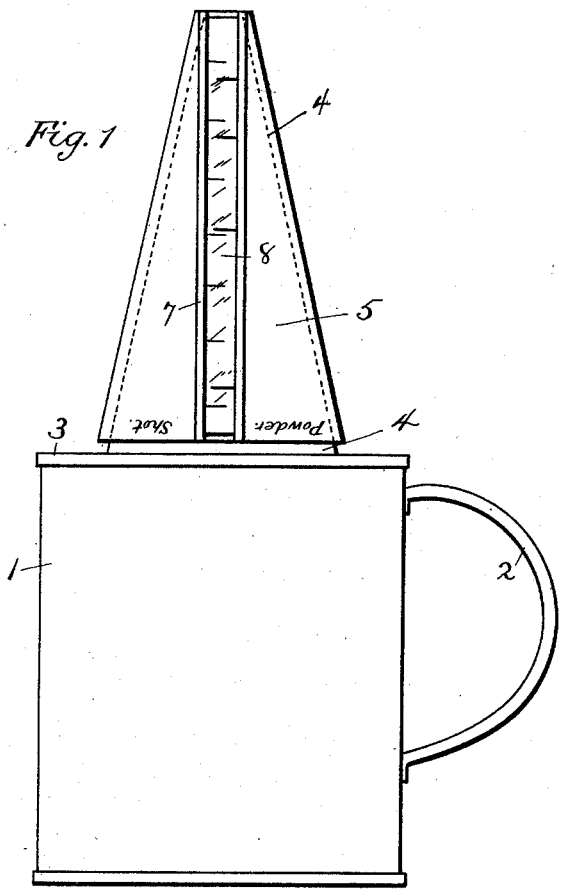
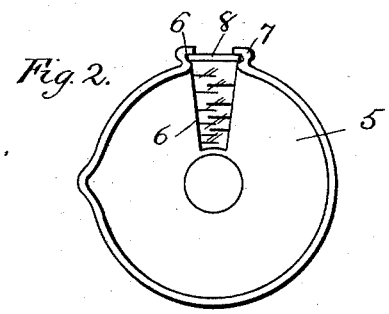
Attest:
Inventor:
G. R. Connally
By Chas J. Gooch
Attorney

UNITED STATES PATENT OFFICE.

GEORGE ROBERT CONNALLY, OF TUPELO, ASSIGNOR OF ONE-HALF TO GEORGE WASHINGTON LOWERY, OF PLYMOUTH, MISSISSIPPI.

CANISTER AND MEASURE.

SPECIFICATION forming part of Letters Patent No. 522,969, dated July 17, 1894.

Application filed March 10, 1894. Serial No. 503,215. (No model.)

*To all whom it may concern:*

Be it known that I, GEORGE ROBERT CONNALLY, a citizen of the United States, residing at Tupelo, in the county of Lee and State of Mississippi, have invented certain new and useful Improvements in Canisters and Measures; and I do hereby declare the following to be a full, clear, and exact description of the invention, such as will enable others skilled in the art to which it appertains to make and use the same.

This invention relates, as hereinafter set forth, to a combined powder-canister and powder and shot-measure.

In the accompanying drawings, Figure 1 represents an elevation of my improved powder-canister and powder-and-shot-measure. Fig. 2 represents an elevation of the measure.

1 represents the body of the canister which is provided with a handle, 2, and a top or lid, 3, which may be removable or stationary as desired. A central opening is formed in the top, 3, from which extends, upwardly, a conical discharge tube or spout, 4, through which the material in said canister, be it powder, shot, or any other material, is discharged into the measure, 5, which is of conical shape, as shown, to adapt it to fit snugly and close the conical discharge tube or spout, 4. In one side of this conical measure a slot, 6, is formed by slitting the material of which said measure is composed, and bending the edges of such slit portion laterally so as to form grooved ribs, 7, within which is seated a transparent slide, 8, through which the interior of said measure may be viewed; this transparent slide covers the slot so as to prevent the escape therethrough of the material being measured and has thereon graduation marks indicating weight or measure denominations corresponding with indicating symbols marked on the measure on opposite sides of the slot therein. In my arrangement, the graduation marks on the slide, and the symbols on either side of the measure adjacent thereto, are so arranged as to admit of the measuring of materials differing in weight for instance, in the illustration shown, the one scale indicates the measure, or weight, of the quantity of powder, and the other scale the quantity of shot discharged into the measuring vessel.

Some of the advantages secured by my invention are that the powder canister can readily and safely be handled and transported and used without danger and without the liability of loss by spilling usually encountered when powder is handled in loose condition and transported by scoop from its place of storage to a scale. The necessity of similarly transporting shot from its receptacle to a scale is also avoided, as the measure can be taken directly to the place of storage and the shot measured there, thereby avoiding the loss by spilling usually the case when shot is carried by scoop to a scale for weighing.

Not only is the danger of having a loss in transportation avoided by the employment of my device, but a saving of time is effected over the ordinary scoop-and-scale method of measuring in vogue, as the measuring is, by my device, greatly accelerated.

Having thus described my invention, what I claim is—

A combined canister and measure, consisting of a canister having an upwardly-extending conical discharge-spout, and a conical measuring-cap therefor having in one side a vertical slot, grooved ribs on opposite sides of said slot, a transparent graduated slide seated within said grooves, and measuring symbols of varying character on the side of said measure adjacent to the respective edges of said slide, substantially as and for the purpose set forth.

In testimony whereof I affix my signature in presence of witnesses.

GEORGE ROBERT CONNALLY.

Witnesses:
W. D. HAMILTON,
I. H. PATTON,
B. A. SMITH.